United States Patent
Marshall et al.

(10) Patent No.: US 9,549,419 B2
(45) Date of Patent: Jan. 17, 2017

(54) TRIGGER MECHANISM

(71) Applicants: Roger Stuart Marshall, Auburn, WA (US); Gordon John Hines, Kirkland, WA (US); Victor Burton, Bellevue, WA (US); Thomas Woodrow Nesmith, Kenmore, WA (US); Todd Poremba, Seattle, WA (US)

(72) Inventors: Roger Stuart Marshall, Auburn, WA (US); Gordon John Hines, Kirkland, WA (US); Victor Burton, Bellevue, WA (US); Thomas Woodrow Nesmith, Kenmore, WA (US); Todd Poremba, Seattle, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/857,477

(22) Filed: Sep. 17, 2015

(65) Prior Publication Data
US 2016/0227372 A1  Aug. 4, 2016

Related U.S. Application Data

(60) Provisional application No. 62/110,329, filed on Jan. 30, 2015.

(51) Int. Cl.
*H04M 11/04* (2006.01)
*H04W 76/00* (2009.01)
*H04W 4/22* (2009.01)
*H04W 4/02* (2009.01)
*H04W 88/02* (2009.01)

(52) U.S. Cl.
CPC ............. *H04W 76/007* (2013.01); *H04W 4/02* (2013.01); *H04W 4/025* (2013.01); *H04W 4/22* (2013.01); *H04W 88/02* (2013.01)

(58) Field of Classification Search
CPC ........ H04W 76/007; H04W 4/22; H04W 4/02; H04W 4/025; H04W 88/02
USPC ..... 455/404.1, 404.2, 550.1; 379/45, 38, 42, 379/43
See application file for complete search history.

(56) References Cited

U.S. PATENT DOCUMENTS

| | | | |
|---|---|---|---|
| 8,050,386 B2 | 11/2011 | Dickinson | |
| 8,681,946 B2 | 3/2014 | Dickinson | |
| 8,824,487 B1 | 9/2014 | Ray | |
| 8,976,939 B1 | 3/2015 | Hamilton et al. | |
| 2007/0082650 A1 | 4/2007 | Zhu et al. | |
| 2007/0201623 A1* | 8/2007 | Hines | H04Q 3/72 379/37 |
| 2010/0074148 A1* | 3/2010 | Poremba | H04L 12/66 370/259 |
| 2010/0166154 A1* | 7/2010 | Peters | H04M 3/5116 379/45 |

(Continued)

*Primary Examiner* — Khai M Nguyen
(74) *Attorney, Agent, or Firm* — Tarolli, Sundheim, Covell & Tummino LLP

(57) ABSTRACT

An Automatic Location Identifier (ALI) trigger mechanism can include a data tap configured to detect an ALI location request for an emergency services call. The data tap can also be configured to output a trigger signal in response to detecting the ALI location request. The ALI trigger mechanism can also include a metadata router configured to receive the trigger signal and output an enhanced caller information request to a metadata server in response to the trigger signal.

18 Claims, 3 Drawing Sheets

(56) References Cited

U.S. PATENT DOCUMENTS

| | | | |
|---|---|---|---|
| 2013/0029634 A1* | 1/2013 | Li | H04W 4/22 455/404.2 |
| 2013/0229282 A1 | 9/2013 | Brent | |
| 2013/0303196 A1* | 11/2013 | Mitchell | G01S 5/0018 455/456.3 |
| 2013/0324149 A1* | 12/2013 | Fix | H04W 24/02 455/456.1 |
| 2014/0072111 A1* | 3/2014 | Klaban | B60R 25/33 379/45 |
| 2016/0014587 A1* | 1/2016 | Hines | H04L 12/6418 455/404.2 |
| 2016/0019538 A1* | 1/2016 | Arif | G06Q 20/322 705/44 |
| 2016/0227589 A1* | 8/2016 | Marshall | H04W 4/02 |

\* cited by examiner

TRIGGER MECHANISM

CROSS-REFERENCE TO RELATED APPLICATION

This application claims the benefit of priority to U.S. Provisional Application No. 62/110,329, filed on Jan. 30, 2015, and entitled E9-1-1 ALI TRIGGER SYSTEM AND METHOD TO SUPPLY ENHANCED DATA, this application is also related to the a commonly assigned patent applications entitled ANCILLARY DATA FOR AN EMERGENCY SERVICES CALL, which claims the benefit of priority to U.S. Provisional Patent Application No. 62/110, 318, filed on Jan. 30, 2015, and entitled ANCILLARY DATA DELIVERY MECHANISM FOR EMERGENCY COMMUNICATION the entirety of each is herein incorporated by reference.

TECHNICAL FIELD

This disclosure relates to an Automatic Location Identifier (ALI) trigger mechanism.

BACKGROUND 9-1-1 is a phone number widely recognized in North America as an emergency phone number that is used to contact emergency dispatch personnel. Enhanced 9-1-1 (E9-1-1) is defined by an emergency call being selectively routed to an appropriate Public Service Answering Point (PSAP), based on an identifier, such a Automatic Number Identifier (ANI), a Pseudo Automatic Number Identifier (pANI), an Emergency Services Routing Key (ESRK), any of which can generically be referred to an ESxK or a locator key. The locator key can include the transmission of callback number and location information when 9-1-1 is used. E9-1-1 may be implemented for wireless, (e.g., cellular) landline, or VoIP networks.

A PSAP is a dispatch office that receives 9-1-1 calls (voice or text messages) from the public. A PSAP may be a local, fire or police department, an ambulance service or a regional office covering all services. As used herein, the term PSAP can alternatively refer to an Emergency Call Center (ECC) a term employed for Voice over Internet Protocol (VoIP) systems.

SUMMARY

One example relates to an Automatic Location Identifier (ALI) trigger mechanism that can include a data tap configured to detect an ALI location request for an emergency services call. The data tap can also be configured to output a trigger signal in response to detecting the ALI location request. The ALI trigger mechanism can also include a metadata router configured to receive the trigger signal and output an enhanced caller information request to a metadata server in response to the trigger signal.

Another example relates to a system that can include an ALI trigger mechanism. The ALI trigger mechanism can include a data tap configured to output a trigger signal in response to detecting an ALI location request for an emergency service call by a caller. The ALI trigger mechanism can also include a metadata router configured to output an enhanced caller information request in response to the trigger signal. The system can also include a metadata server comprising one or more computing devices. The metadata server can be configured to receive the enhanced caller information request via a network. The metadata server can also be configured to query an information source via the network for information related to an end-user device employed to initiate the emergency services call and/or the caller.

Still another example relates to a method that can include detecting an ALI location request provided to an ALI client via a cable. The ALI location request can include a locator key corresponding to an emergency services call initiated by a wireless phone. The method can also include providing a trigger to a metadata router in response to detecting the ALI location request and generating an enhanced caller information request in response to receiving the trigger, wherein the enhanced caller information request includes the locator key.

DETAILED DESCRIPTION

This disclosure relates to an Automatic Location Identifier (ALI) trigger mechanism. The ALI trigger mechanism can be implemented as a hardware device that can include a data tap and a metadata router (e.g., a networked computing system) that can be configured to monitor existing Automatic Location Identifier (ALI) traffic events such as location requests. The ALI trigger mechanism can employ the metadata router to provide a request for enhanced caller information (e.g., rich data) to a Public Services Answering Point (PSAP) operator or a third party entity (e.g., another call center or a first responder) without the need for manual interaction during an active emergency call. In some examples, the enhanced caller information can include, but is not limited to indoor location information (e.g., latitude and longitude coordinates and an altitude). Moreover, the trigger mechanism can be fully integrated with existing an ALI system and PSAP systems without any modification to existing ALI data or call handling equipment. By employment of the trigger mechanism, the enhanced caller information can be tailored for a specific receiver (e.g., the PSAP operator and/or the third party entity) and delivered via standardized messaging protocols, such as via a Hyper Text Transfer Protocol Secure (HTTPS) browser session.

Figure 1:
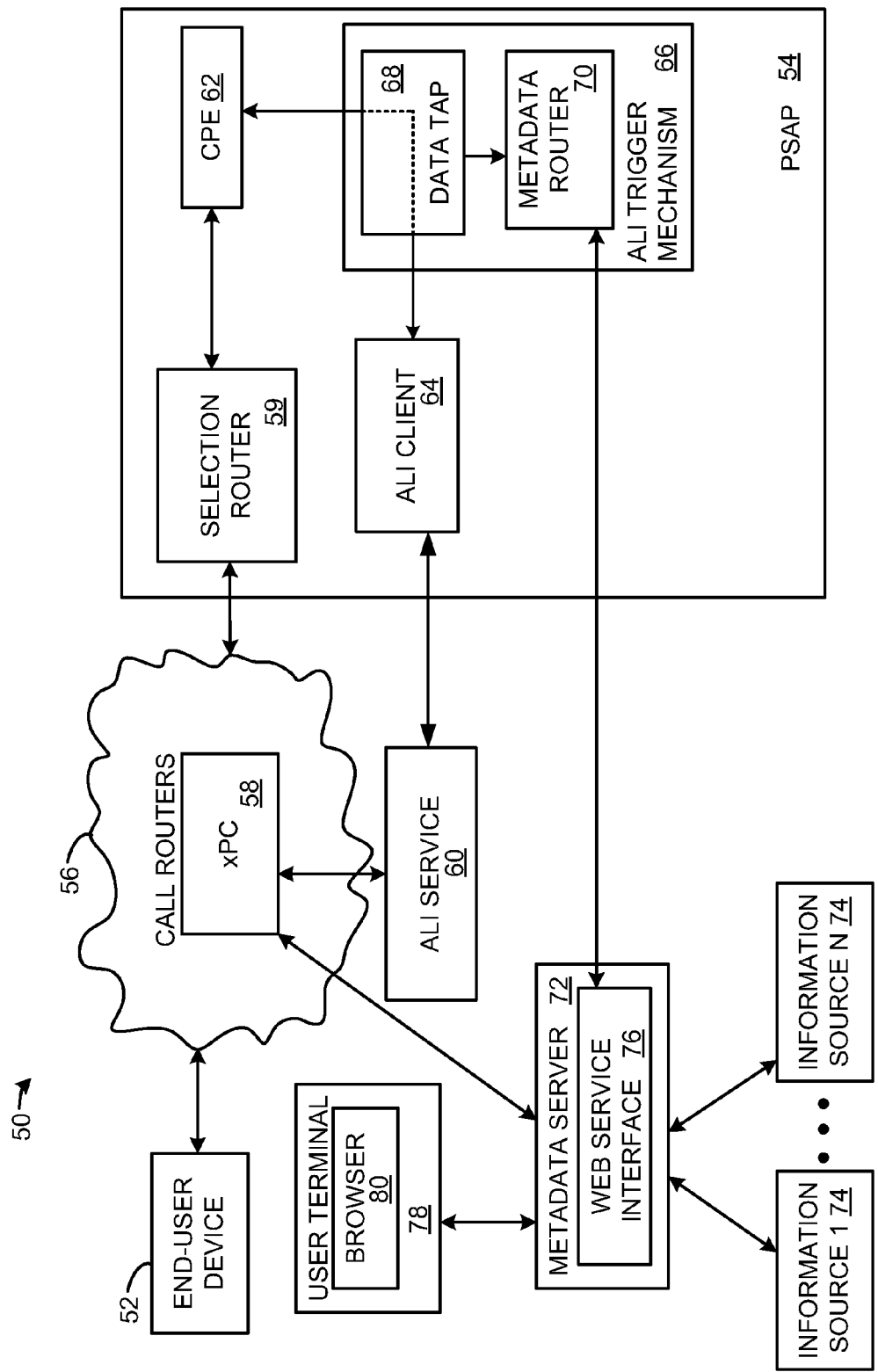
FIG. 1 illustrates an example of a system configured to process an emergency services call.

FIG. 1 illustrates an example of a system 50 configured to facilitate the processing of emergency calls. The system 50 can include an end-user device 52 operated by an end-user, which end-user can be referred to as a caller. The end-user device 52 can be a mobile device, such as a wireless phone (e.g., a smart phone, a feature phone, etc.). In some examples, the end-user device 52 can be a Voice over Internet Protocol (VoIP) phone or a landline phone.

The end-user device 52 can be employed by the caller to initiate an emergency services call. The emergency services call can be, for example, a voice 9-1-1 call, a 9-1-1 text (or short) message (e.g., a short message service (SMS) message), etc. The emergency services call can be a request for immediate emergency assistance, including ambulatory service, police assistance, fire department assistance, assistance on waterways or some combination thereof.

The emergency services call can be routed to a PSAP 54 via call routers 56. The call routers 56 can be representative of a collection of telephony routers, including, but not limited to a cell tower, a mobile switching center (MSC), selective routers, etc. The call routers 56 can also include a positioning center 58, which can be referred to as "xPC" 58. The xPC 58 can be representative of nearly any positioning center, including a Mobile Positioning Center (MPC), a Gateway Mobile Positioning Center (GMLC), a VoIP Positioning Center (VPC), etc. The call routers 56 can be implemented as part of the Public Switched Telephone Network (PSTN), the Internet and/or as part of a private network (e.g., a wireless carrier network). The xPC 58 can assign an identifier to the emergency services call. The identifier can be an Automatic Number Identifier (ANI) (e.g., a standard telephone number), a Pseudo Automatic Number Identifier (pANI), an Emergency Services Routing Key (ESRK), any of which can generically be referred to as a locator key (or ESxK). The call routers 56 can include the locator key with the emergency services call forwarded to the PSAP 54.

The PSAP 54 can include a selection router 59 that can route the emergency services call to an appropriate instance of customer premise equipment (CPE) 62 (e.g., a PSAP CPE). The selection router 59 can be implemented, for example, as a private branch exchange (PBX) system. The CPE 62 can be implemented, for example, as a user terminal that implements standard PSAP software. The CPE 62 can be employed by a PSAP operator to establish bi-directional communication (e.g., voice or text) with the caller making the emergency services call.

The xPC 58 can be configured to communicate with an ALI service 60. The ALI service 60 can be configured as a look-up database. Thus, ALI service 60 can be representative of a plurality of computing devices (e.g., a computing cloud) operating in concert to deploy the ALI service 60. Alternatively, the ALI service 60 can be implemented with a single server. The ALI service 60 can be employed as an example of an ALI that can provide location information for emergency service calls in response to a location request.

The emergency services call routed to the CPE 62 can include the locator key that can (at least temporarily) uniquely identify the end-user device 52. The CPE 62 can provide an ALI location request to an ALI client 64 that includes the locator key. The ALI client 64 can be implemented, for example, as an ANI-ALI controller. The ALI location request can be implemented as a request in the extended ALI format, National Emergency Number Association (NENA) 04-001 (ALI request) as bits on a wire, a network request (e.g., a TCP/IP formatted message, etc. The ALI client 64 can be an interface for the ALI service 60. In some examples, the ALI service 60 and the ALI client 64 can be integrated on a single server, such as a server located at the PSAP 54. In other examples, the ALI client 64 can be physically separated from the ALI service 60. An ALI trigger mechanism 66 can be configured to detect the ALI location request.

In some examples, the CPE 62 can be coupled (directly or indirectly) to the ALI client 64 via an RS232 cable (e.g., a serial cable). In other examples, the CPE 62 can be coupled to the ALI client 64 with a network connection (e.g., an Ethernet cable) or a proprietary cable. The ALI trigger mechanism 66 can include a data tap 68 that can detect the ALI location request. The data tap 68 can be implemented as a passive component such as a splitter or a switch. In either situation, the data tap 68 may (but is not required to) be configured to receive external power to amplify signals passing through the data tap 68. Thus, as used herein, the term "passive component" indicates that the component can operate without interrupting (or otherwise interfering with) the ALI location request being provided to the ALI client 64, even in situations where the data tap 68 loses power (if the data tab 68 employs external power). Instead, the data tap 68 provides a trigger signal to a metadata router (MDR) 70 of the ALI trigger mechanism 66 in response to detecting the ALI location request. The trigger signal can include the information included in the ALI location request, including the locator key assigned to the end-user device 52 for the emergency services call. The metadata router 70 can be a computing device (e.g., a router) that can be configured to provide an enhanced caller information request for the caller employing the end-user device 52 to make the emergency services call. The enhanced caller information request can be provided over a network protocol such as the E2 protocol, TCP/IP, a proprietary network protocol, etc.

In some examples, the data tap 68 and the ALI trigger mechanism 66 can be logically (and/or physically) connected between the ALI client 64 and the ALI service 60. In such a situation, the data tap 68 can provide the trigger signal to the metadata router 70 in response to receiving a location request directed from the ALI client 64 to the ALI service 60.

It is noted that the ALI trigger mechanism 66 can be powered off, and the ALI location request to the ALI client 64 will continue to operate as normal. In some situations, such as a power outage, emergency power may not be provided to the ALI trigger mechanism 66. In these situations, legacy equipment, such as the CPE 62 and the ALI client 64 may receive emergency power and continue to operate. In this manner not every component of the PSAP 54 needs to receive emergency power for the PSAP 54 to effectively operate in some capacity.

The ALI client 64 can forward the ALI location request to the ALI service 60. The ALI service 60 can query a local database and/or query the xPC 58 for location information (e.g., a street address or latitude and longitude co-ordinates) of the end-user device 52. The ALI service 60 can receive the location information and forward the location information back to the ALI client 64. The ALI client 64 can forward the location information for the caller to the CPE 62. The CPE 62 can output text that characterizes the location information that can be read by the operator of the CPE 62.

Concurrent with the processing of the ALI location request, the metadata router 70 can forward the enhanced caller information request to a metadata server 72. The metadata server 72 can be implemented as a distributed computing system (e.g., a cloud server) or as a single server. The metadata server 72 can employ the E2 protocol to query the xPC 86 for location information for the caller and/or the end-user device 52. Additionally, the metadata server 72 can query N number of information sources 74 for information related to the caller and/or the end-user device 52, where N is an integer greater than or equal to one. The information sources 74 can include, for example, databases and/or lookup tables, such as a telephone directory, a map, a wireless carrier information directory, WiFi and/or Bluetooth router directories, social media sites, etc. The N number of information sources 74 can provide additional information about the caller and/or the end-user device 52 making the emergency services call. For instance, if a given information source 74 is a wireless carrier information directory, the altitude (detected on the end-user device 52) may be provided to the metadata server 72. Additionally or alternatively, information related to a building layout may be provided to the metadata server 72.

The metadata server 72 can collate data received from each of the N number of information sources 74 to generate enhanced caller information for the caller and/or the end-user device 52. The enhanced caller information can be implemented as data that includes information not accessible by a conventional (legacy) ALI system. The metadata server 72 can include a web service interface 76 (e.g., an interface accessible by a web browser) that can convert the enhanced caller information into a standard format, such as nearly any version of the Hypertext Markup Language (HTML).

The system 50 can include a user terminal 78. The user terminal 78 can be implemented as a computing device with a graphical user interface (GUI), such as a desktop computer, a laptop computer, a tablet computer, a smartphone, etc. In some examples, the user terminal 78 can be integrated with the CPE 62. In other examples, the user terminal 78 can be physically located at the PSAP 54 and employed by the same PSAP operator as the CPE 62, but be implemented as a separate device. In still other examples, the user terminal 78 can be implemented at a separate location as the CPE 62. For instance, the user terminal 78 can be implemented at a security desk (e.g., a secondary security center), a first responder (e.g., an ambulance or police vehicle) or virtually anywhere else. Further, in some examples, there may be multiple instances of the user terminal 78 running concurrently.

The user terminal 78 can execute a web browser 80. The web browser 80 can include an application (e.g., a plug-in) that can periodically and/or intermittently query the web service interface 76 (e.g., via a network, such as the Internet) for updates for emergency services calls. The web service interface 76 can provide the web browser 80 with the enhanced caller information for the caller and/or the end-user device 52 via a standard web protocol, such as the Hypertext Transfer Protocol Secure (HTTPS) protocol. The web browser 80 can provide a GUI that can output the enhanced caller information that characterizing the caller and/or the end-user device 52 (e.g., as a web page).

By employing the system 50, the enhanced caller information can be determined and provided to the user terminal 78 in response to an ALI location request to the ALI client 64. Moreover, no changes are needed to legacy location services (e.g., the ALI service 60 and/or the ALI client 64). Thus, the ALI trigger mechanism 66 can be integrated with the PSAP 54 with minimal deployment costs.

Figure 2:
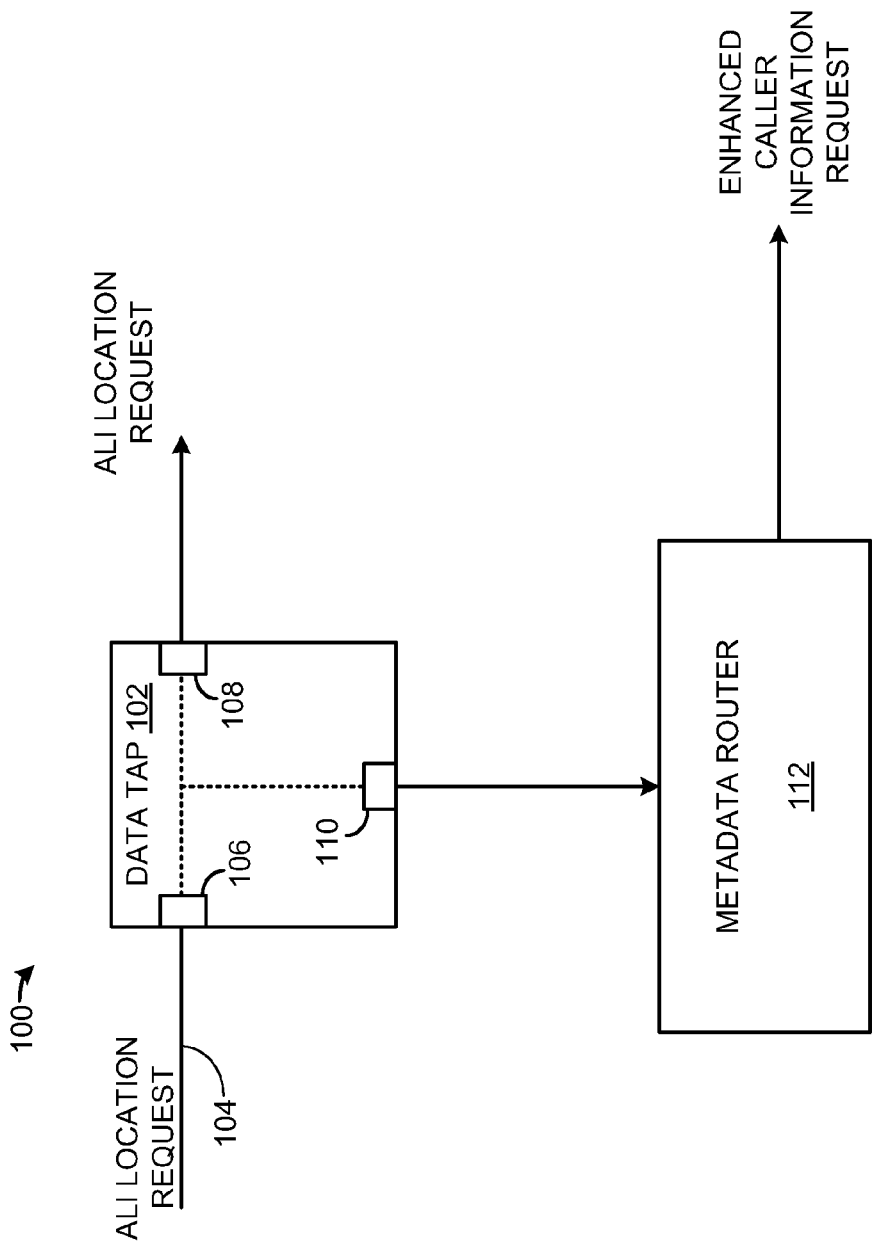
FIG. 2 illustrates an example of an Automatic Location Identifier (ALI) trigger mechanism.

FIG. 2 illustrates an example of an ALI trigger mechanism 100. The ALI trigger mechanism 100 can be employed to implement the ALI trigger mechanism 66 illustrated in FIG. 1. The ALI trigger mechanism 100 can include a data tap 102 that, in some examples, can be logically and/or physically positioned between an instance of CPE of a PSAP (e.g., the CPE 62 of FIG. 1) and an ALI client (e.g., the ALI client 64 of FIG. 1). In other examples, the data tap 102 can be logically and/or physically positioned between the ALI client and the ALI service (e.g., the ALI service 60 of FIG. 1). The data tap 102 can monitor a cable 104 for the presence of an ALI location request (illustrated in FIG. 2 as "ALI LOCATION REQUEST"). The ALI location request can be implemented as a request in the extended ALI format, NENA 04-001 as bits on a wire, a network request (e.g., a TCP/IP) formatted message, etc. The ALI location request can include a locator key corresponding to an end-user device (e.g., a wireless phone) for a particular emergency call.

In some examples, such as situations where the cable 104 is an RS232 cable, the data tap 102 can be implemented as a "piggyback" or "pass-through" cable. In such a situation, the data tap 102 can be physically coupled to the cable 104 at an input port 106. In this situation, the data tap 102 can passively split the ALI location request on the cable 104 into two signals (e.g., without interfering with the ALI location request) that are provided to two output ports, a first output port 108 and a second output port 110. The first output port 108 can forward the ALI location request to the ALI client. In some examples, the first output port 108 can be directly coupled to an input port of the ALI client. Alternatively, the first output port 108 can be coupled to an output cable. The second output port 110 can be coupled to a metadata router 112.

In other examples, such as situations where the cable 104 is a network cable (e.g., an Ethernet cable), the data tap 102 can be implemented as a computing device (e.g., a packet sniffer) that can analyze content of the ALI message request. In this situation, the data tap 102 could be implemented on a router (e.g., as hardware and/or software). However, the data tap 102 does not interfere with or otherwise prevent the ALI location request on the cable 104 from passing to the ALI client. Instead, the computing device generating the ALI location request (e.g., the CPE) does not need to be reconfigured to accommodate the data tap 102 or any feature of the ALI trigger mechanism 100.

The data tap 102 can be configured to provide a trigger signal (e.g., a copy/split of the ALI location request or a reformatted signal) to the second output port 110 in response to detecting an ALI location request present on the cable 104. The metadata router 112, connected directly or indirectly to the second output port 110 of the data tap 102 can be implemented as a hardware device (e.g., a computing device), such as a router. The metadata router 112 can be employed to implement the metadata router 70 illustrated in FIG. 1. The metadata router 112 can be configured to generate an enhanced caller information request. The enhanced caller information request can be provided to a metadata server, such as the metadata server 72 illustrated in FIG. 1. The enhanced caller information request can be provided in a format such as the E2 protocol or another protocol, such as a proprietary protocol. The enhanced caller information request can be processed in a manner illustrated and described with respect to FIG. 1.

Figure 3:
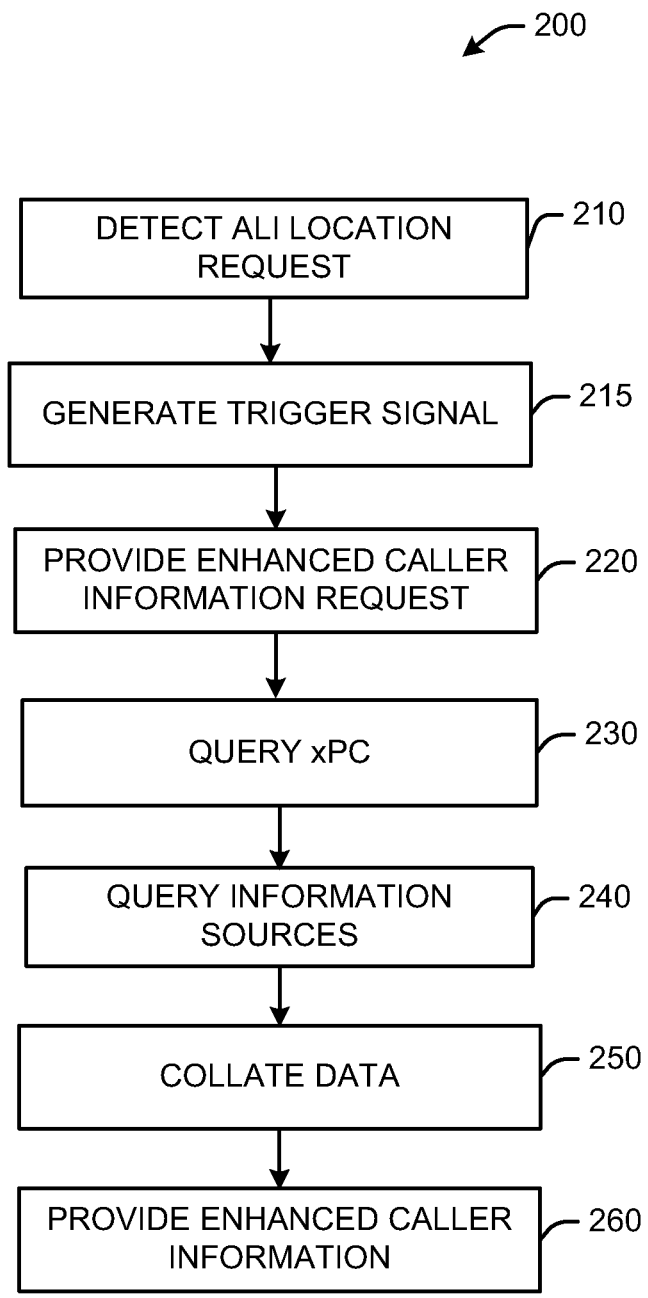
FIG. 3 illustrates a flowchart of an example method for processing an emergency services call.

In view of the foregoing structural and functional features described above, example methods will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 3 can be implemented as instructions stored in a non-transitory machine-readable medium. The instructions can be accessed by a processing resource (e.g., one or more processor cores) and executed to perform the methods disclosed herein.

FIG. 3 illustrates a flowchart of an example method 200 for generating enhanced caller information in response to an ALI location request for an emergency services call. The method 200 can be implemented, for example, by the system 50 illustrated in FIG. 1. The emergency services call can be made by a user (e.g., a caller) employing an end-user device (e.g., the end-user device 52 of FIG. 1). At 210, an ALI location request for the emergency services call can be output by a CPE of a PSAP (e.g., the CPE 62 of FIG. 1) can be detected by a data tap (e.g., the data tap 68 of FIG. 1 and/or the data tap 102 of FIG. 2) of a trigger mechanism.

The location request can include a locator key assigned to the emergency services call. At 215, the data tap can generate a trigger signal in response to detecting the ALI location request. The trigger signal can be a copy of the ALI location request (e.g., a split signal) or a different signal that includes data encoded in the ALI location request.

At 220, a metadata router (e.g., the metadata router 70 of FIG. 1 and/or the metadata router 112 of FIG. 2) can generate an enhanced caller information request that includes the locator key. The enhanced caller information request can include the locator key for the caller. The enhanced caller information request can be provided to a metadata server (e.g., the metadata server 72 illustrated in FIG. 1). At 230, the metadata server can query an xPC (e.g., the xPC 58 of FIG. 1) for location information for the end-user device and/or the caller. Additionally, at 240, the metadata server can query N number of information sources for information related to the caller and/or the end-user device. At 250, data returned by the N number of information sources (e.g., the N number of information sources 74 of FIG. 1) can be collated by the metadata server to form enhanced caller information. At 260, the enhanced caller information can be provided to a web browser (e.g., the web browser 80 illustrated in FIG. 1).

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An Automatic Location Identifier (ALI) trigger mechanism comprising:
   a data tap configured to:
      detect an ALI location request for an emergency services call; and
      output a trigger signal in response to detecting the ALI location request, wherein the data tap is a passive component that does not interfere with the ALI location request from being sent to an ALI client or an ALI service;
   and
   a metadata router configured to:
      receive the trigger signal; and
      output an enhanced caller information request to a metadata server in response to the trigger signal.

2. The ALI trigger mechanism of claim 1, wherein the data tap comprises an input port for receiving a cable that outputs the ALI location request.

3. The ALI trigger mechanism of claim 2, wherein the cable is an RS232 cable.

4. The ALI trigger mechanism of claim 1, wherein the data tap receives external power.

5. The ALI trigger mechanism of claim 1, wherein the ALI location request includes a locator key assigned to an end-user device employed to initiate the emergency services call.

6. The ALI trigger mechanism of claim 5, wherein the end-user device is a wireless phone.

7. A system comprising:
an Automatic Location Identifier (ALI) trigger mechanism comprising:
- a data tap configured to output a trigger signal in response to detecting an ALI location request for an emergency service call by a caller, wherein the data tap is a passive device that does not interfere with the ALI location request from being sent to an ALI client or an ALI service; and
- a metadata router configured to output an enhanced caller information request in response to the trigger signal; and a metadata server comprising one or more computing devices, the metadata server being configured to:
- receive the enhanced caller information request via a network; and
- query an information source via the network for information related to an end-user device employed to initiate the emergency services call and/or the caller.

8. The system of claim 7, wherein the information sources comprises a plurality of information sources, the metadata server being further configured to collate data from each of the plurality of information sources to form the enhanced caller information.

9. The system of claim 8, wherein the metadata server is further configured to convert the enhanced caller information into the Hypertext Markup Language (HTML) format.

10. The system of claim 9, wherein the metadata server is further configured to provide the enhanced caller information to a web browser operating on a user terminal.

11. The system of claim 10, wherein the user terminal is operating at a Public Safety Answering Point (PSAP).

12. The system of claim 10, wherein the user terminal is operating at a secondary call center.

13. The system of claim 7, wherein the ALI location request is provided on an RS232 cable.

14. The system of claim 7, wherein the ALI location request is provided by customer premise equipment (CPE) at a Public Safety Answering Point (PSAP).

15. A method comprising:
- detecting a location request provided to an Automatic Location Identifier (ALI) client via a cable, wherein the ALI location request includes a locator key corresponding to an emergency services call initiated by a wireless phone;
- providing, by a data tap, a trigger to a metadata router in response to detecting the ALI location request, wherein the data tap is a passive component that does not interfere with the ALI location request from being sent to an ALI client or an ALI service; and
- generating an enhanced caller information request in response to receiving the trigger, wherein the enhanced caller information request includes the locator key.

16. The method of claim 15, further comprising:
- querying a positioning center for location information for the end-user device, wherein the query to the positioning center includes the locator key; and
- querying a plurality of information sources for information corresponding to the wireless phone.

17. The method of claim 16, further comprising:
- collating data received from the plurality of information sources to form the enhanced caller information.

18. The method of claim 17, wherein the enhanced caller information includes data characterizing an altitude of the end-user device.

* * * * *